Figure 1:
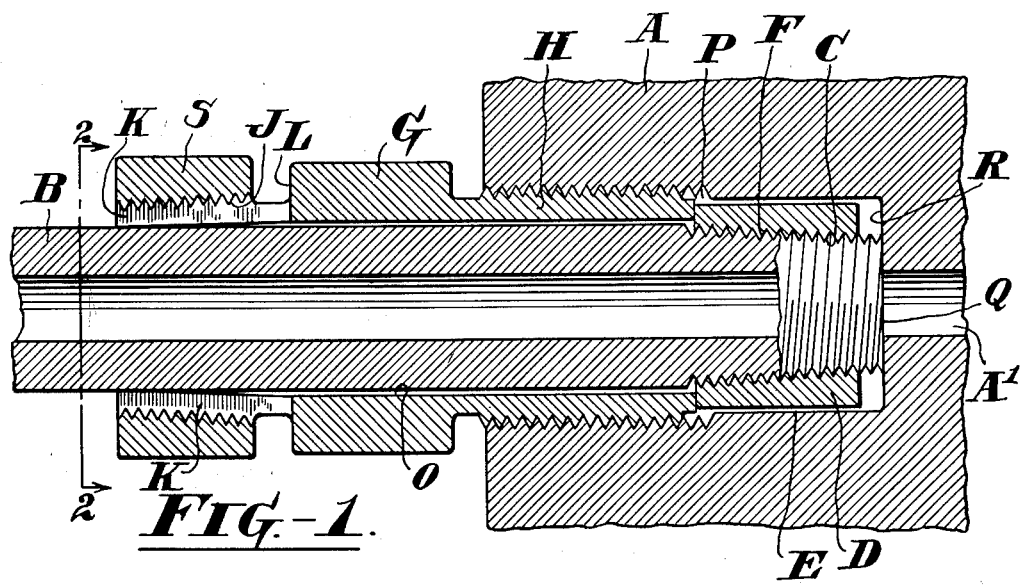

April 7, 1931.    G. J. RATHBUN    1,799,762
PIPE COUPLING
Filed Jan. 23, 1929

INVENTOR.
George J. Rathbun
BY
HIS ATTORNEY

Patented Apr. 7, 1931

1,799,762

UNITED STATES PATENT OFFICE

GEORGE J. RATHBUN, OF EASTON, PENNSYLVANIA, ASSIGNOR TO INGERSOLL-RAND COMPANY, OF JERSEY CITY, NEW JERSEY, A CORPORATION OF NEW JERSEY, AND THE RATHBUN-JONES ENGINEERING COMPANY, OF TOLEDO, OHIO, A CORPORATION OF OHIO

PIPE COUPLING

Application filed January 23, 1929. Serial No. 334,404.

This invention relates to pipe couplings, but more particularly to a pipe coupling adapted to form a connection between the injection nozzle of an oil engine and an oil feed pipe of small diameter or other apparatus of like nature where extremely high pressures are encountered.

One object of this invention is to enable a pipe of small diameter to be secured to a casting or other element in such a manner that the joint will be leak proof and easily coupled and uncoupled without injury to the pipe or the necessity of gripping the pipe with a pipe wrench or other implement.

Another object is to support the pipe against vibration where it is most easily damaged by vibration, namely, at the juncture of the receiving or discharging element and the pipe.

A still further object is to overcome the difficulty of securing safely a small pipe under high pressure by the fine threads which the small diameter of the pipe necessitates.

Other objects will be in part obvious and in part pointed out hereinafter.

Figure 2:
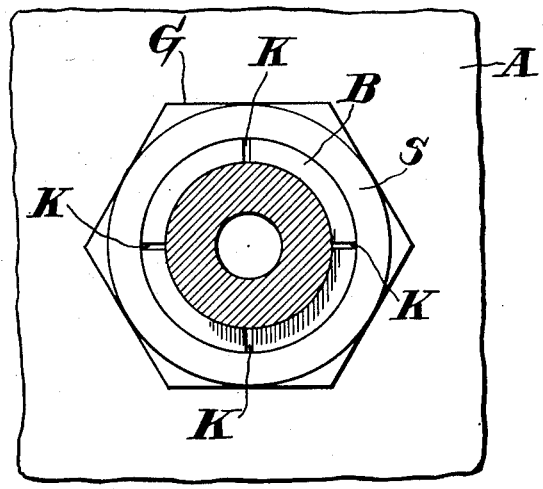

In the drawings forming part of the specification,

Figure 1 shows a longitudinal section of part of the pipe, the coupling, and part of the injection nozzle of an oil engine, and Figure 2 is an end view with a section taken on the line 2—2 looking in the direction indicated by the arrows.

Referring more particularly to the drawings, A indicates part of the injection nozzle of an oil engine to which leads an oil injection pipe B. It is, of course, understood that the injection nozzle of an oil engine is used merely for illustration and that the coupling may be used on any receiving or discharging element where such a coupling is suitable.

The pipe B is pipe threaded at C for a substantial distance. There is provided a sleeve D and an external cylindrical surface E having its interior pipe threaded as at F. A jamb nut G preferably of hexagonal form has an externally right-hand threaded extension H and a second pipe threaded extension J. The extension J is split longitudinally as at K from the forward end up to a forward shoulder L of the jamb nut proper. The jamb nut G has a cylindrical bore O running throughout its length.

The injection nozzle A is provided with a cylindrical hole P, having a substantial part of its outward end threaded, and an oil passage A'. It is obvious that if the fine threads F of the pipe B are screwed directly into a correspondingly threaded aperture in a cast iron element such as A, a dangerously weak joint would be formed. With this danger in view the present coupling was devised.

The method of securing the pipe to the oil injection nozzle A or other apertures to which it may be desired to attach such a pipe is as follows: The left hand pipe threaded sleeve D is screwed on to the pipe threaded portion F of the pipe B. The end of the pipe with the sleeve D attached is then inserted into the hole P and the right hand threaded portion H of the jamb nut G is screwed into the casting A and forces the end Q of the pipe B to seat firmly against the end wall R of the hole P. A nut S is then screwed over the pipe threaded end J of the jamb nut G, forcing the split ends of the jamb nut G into firm contact with the pipe B. As has been described above, the sleeve D is threaded on the end of the pipe B in left hand direction and the jamb nut G is threaded into the injection nozzle A in a right-hand direction. Therefore, as the jamb nut is screwed into place bearing against the sleeve D the tendency is for the sleeve D to screw on to the pipe B instead of off. This provides a very convenient form of flange at the end of the pipe B for an abutment for the flange D to bear against. The flange D is just as solid for the purpose of an abutment as though it were formed integrally with the pipe B. The end of the pipe B which bears against the surface R may be ground off so as to make a very tight joint or if the pipe B is of copper, as is usually the case, the metal will yield so as to seat perfectly on the face R. In practice it is very desirable to have the abutment against which the jamb nut G bears, removable, so that the coupling or jamb nut G may be removable from the pipe. Therefore, it is not particularly desirable to have such an abutment formed integrally with the pipe B. Furthermore, if the abutment is made integrally with a copper pipe it is not strong enough to stand the pressure of the steel jamb nut G. Therefore, in a construction provided by this invention the sleeve D may be made of steel or other hard and durable material which is preferable for the purpose as compared with the material of which the pipe B is made.

It is obvious that by using heavy threads on the threaded portion of the hole P and providing a jamb nut of steel or other suitable material, an extremely strong connection can be formed in the manner described. One great advantage of this coupling is that no gaskets are necessary to form a leak proof connection. Should it be necessary to place a gasket between the end wall R and the end Q of the pipe due to wear or damage of these parts, the coupling need in no way be altered but will function perfectly with or without a gasket. It will also be readily seen that it is not necessary to grip the pipe B and thus injure its appearance or strength since all that is necessary in removing or inserting the pipe B is to apply a wrench first to the nut S removing it and then to the nut G. After these nuts have been removed, the pipe B may be withdrawn from the hole P.

I claim:

1. In a pipe coupling, the combination of an internally threaded sleeve adapted to be attached on a threaded pipe end and a jamb nut adapted to be screwed into a receiving or discharging element and against said sleeve to force the end of said pipe into leak proof contact with said receiving and discharging element, the jamb nut and sleeve being provided with threads opposite in direction.

2. In a pipe coupling, an internally threaded sleeve adapted to be screwed on a threaded pipe end to form an abutment, and an externally threaded jamb nut in slidable contact with the pipe for substantially the entire length of said nut and adapted to be screwed into a receiving element and against the sleeve to force the end of the pipe into leak proof contact with the receiving element.

3. In a pipe coupling, an internally threaded sleeve adapted to be screwed on a threaded pipe end to form an abutment, an externally threaded jamb nut in slidable contact with the pipe for substantially the entire length of said nut and adapted to be screwed into a receiving element and against the sleeve to force the end of the pipe into leak proof contact with the receiving element, and means on the jamb nut to clamp it upon the pipe.

In testimony whereof I have signed this specification.

GEORGE J. RATHBUN.